United States Patent [19]
Council

[11] 3,828,874
[45] Aug. 13, 1974

[54] CRAWLER UNDERCARRIAGE

[75] Inventor: Malcolm N. Council, Richardson, Tex.

[73] Assignee: Gardner-Denver Company, Quincy, Ill.

[22] Filed: Oct. 27, 1972

[21] Appl. No.: 301,701

Related U.S. Application Data

[63] Continuation of Ser. No. 100,228, Dec. 21, 1970, abandoned.

[52] U.S. Cl. .............................. 180/9.6, 180/9.54
[51] Int. Cl. ........................................... B62d 55/10
[58] Field of Search .................. 180/9.5, 9.54, 9.6; 280/111, 112 R

[56] References Cited
UNITED STATES PATENTS

| | | | |
|---|---|---|---|
| 1,482,726 | 2/1924 | Best | 180/9.54 |
| 1,516,578 | 11/1924 | Platt | 180/9.6 |
| 1,806,819 | 5/1931 | Paulsen | 180/9.54 |
| 2,936,841 | 5/1960 | Mazzarins | 180/9.54 |

FOREIGN PATENTS OR APPLICATIONS

| | | | |
|---|---|---|---|
| 116,141 | 5/1918 | Great Britain | 180/9.6 |
| 425,098 | 2/1926 | Germany | 280/111 |
| 730,095 | 5/1932 | France | 280/111 |
| 912,090 | 4/1946 | France | 280/111 |

Primary Examiner—Robert S. Ward, Jr.
Assistant Examiner—Reinhard J. Eisenzopf
Attorney, Agent, or Firm—M. E. Martin

[57] ABSTRACT

A crawler undercarriage for a mobile rock drill unit or the like comprising spaced apart parallel crawler assemblies having crawler frames which are pivotally interconnected by a transverse axle located substantially midway the length of the crawler frames. A pair of transverse equalizer beams substantially equally spaced on each side of the transverse axle are pivotally connected to the crawler frames and to a main support platform for the rock drill unit by means of spherical self-aligning bearings.

3 Claims, 7 Drawing Figures

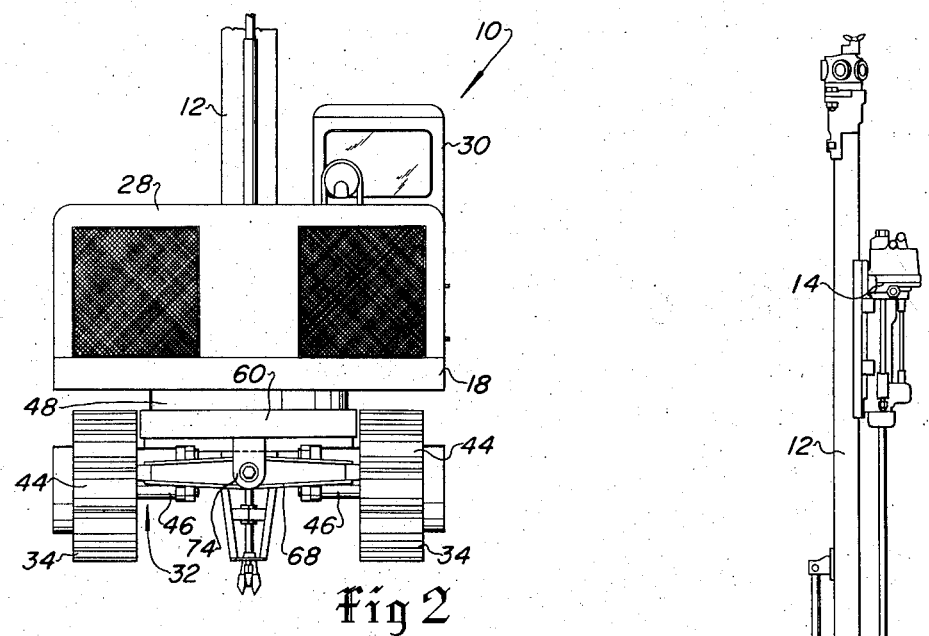
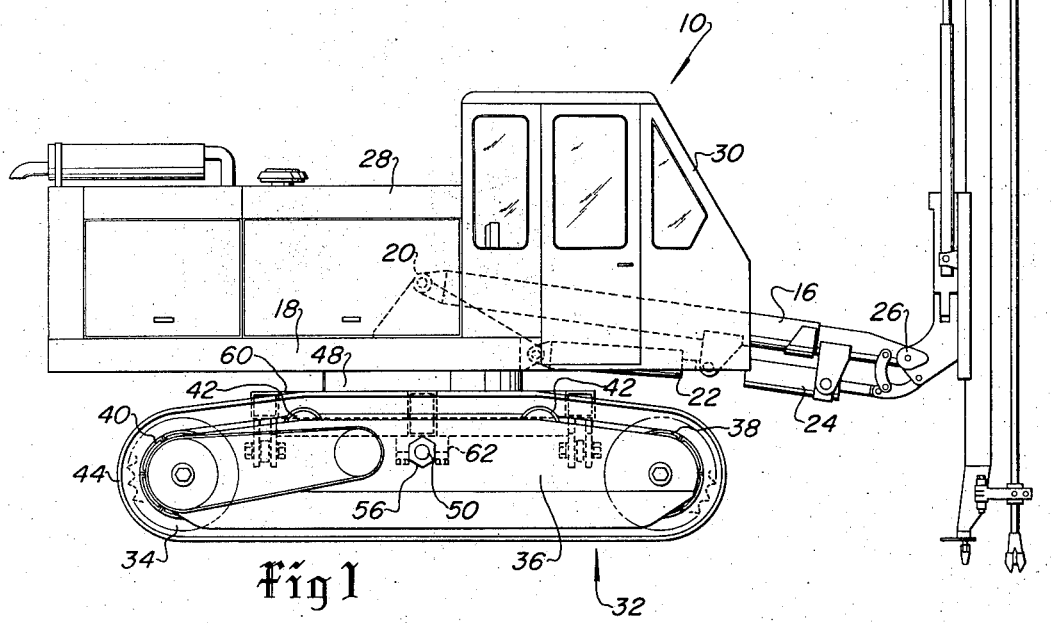

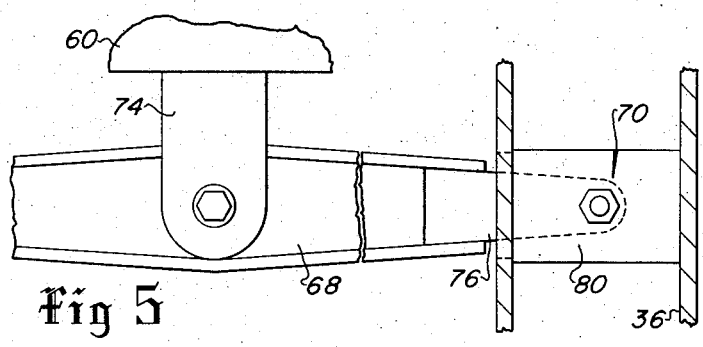
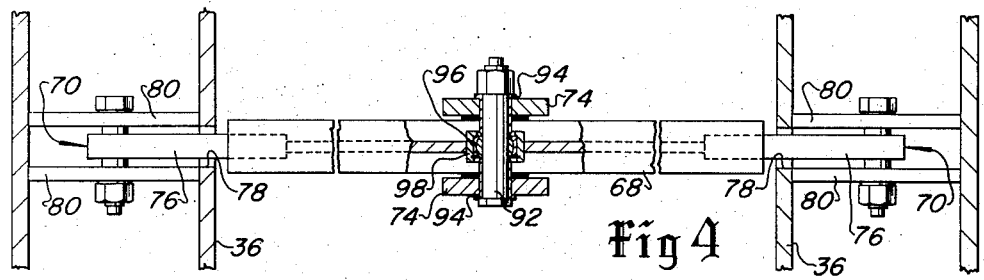
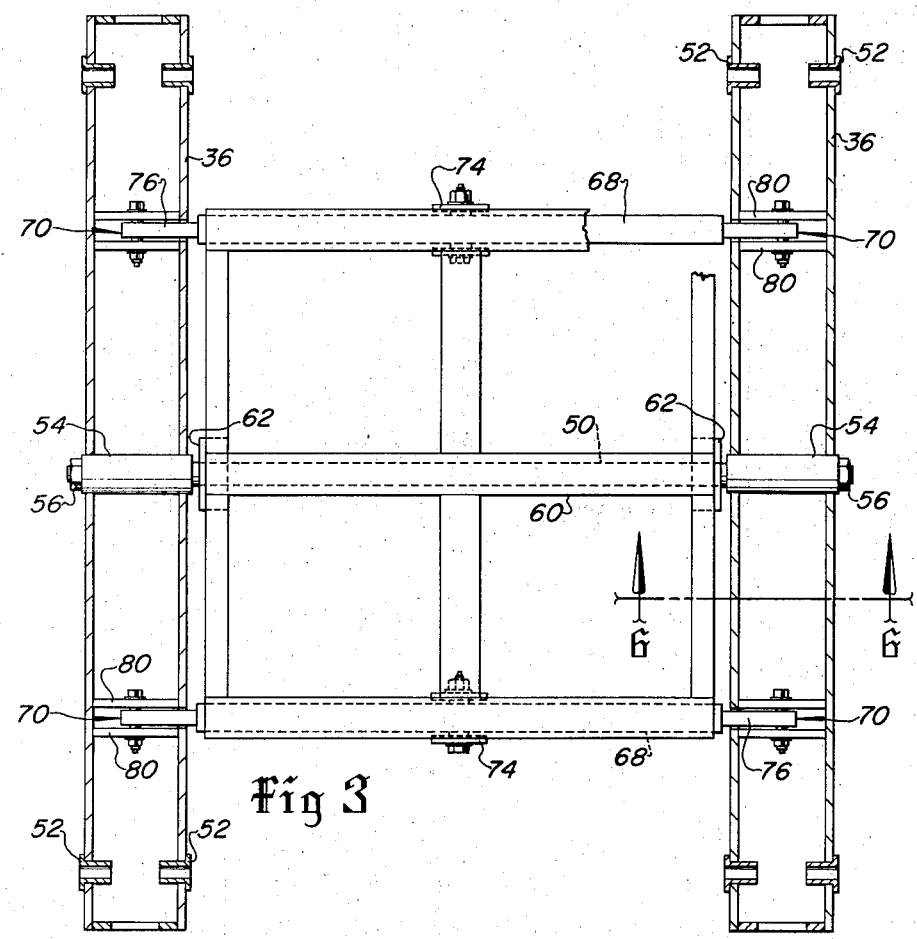

3,828,874

CRAWLER UNDERCARRIAGE

This is a continuation of application Ser. No. 100,228, filed Dec. 21, 1970 now abandoned.

BACKGROUND OF THE INVENTION

Crawler type undercarriages are well known and widely used for supporting rock drill units and other types of machines. Crawler undercarriages are quite suitable for transportation over rough terrain and they provide greater stability than most other types of mobile carriers. Prior art crawler undercarriages are generally characterized by a pair of crawler assemblies including spaced apart crawler frames interconnected by a transverse axle pivotally mounted near one end of the crawler frames. The opposite ends of the respective crawler assemblies are usually interconnected by what is known in the art as an equalizer beam whereby the weight of the machine is more evenly distributed over the entire crawler assemblies and the tendency for the crawler assemblies to spread laterally is reduced. This general type of undercarriage is an improvement over types wherein the crawler assemblies are rigidly interconnected in that pivotal movement of one crawler assembly with respect to the other is provided when traversing rough terrain to reduce tilting and instability of the unit.

Although the above mentioned type of undercarriage provides for reduced tilting of the unit when encountering rough terrain while moving in one direction the position of the transverse axle at or near one end of the crawler assemblies results in substantial tilting and attendant instability problems when rough terrain is encountered by the end of the crawlers near which the axle is located.

Another problem associated with crawler undercarriages in which a single equalizer beam is employed concerns the bending loads imposed on the axle as a result of "toeing-in" of the crawler assemblies at the opposite or equalizer beam end when the assemblies are pivotally moved with respect to each other. Attempts to overcome this problem by means providing for lateral movement of the equalizer beam with respect to the track frame are only partially satisfactory.

The trend to heavier and more mobile rock drill units has made necessary the solution to the above mentioned problems encountered with prior art undercarriages. Moreover, the problem of providing more uniform weight distribution to enhance the stability of such equipment has also been evident.

SUMMARY OF THE INVENTION

The present invention provides for a crawler undercarriage for use with mobile rock drill units or the like wherein mobility and stability are increased by providing a pair of spaced apart crawler assemblies pivotally interconnected by a transverse axle located substantially midway the length of the crawler frames. With a crawler undercarriage according to the present invention, a rock drill unit mounted thereon may be more easily located in a position of minimum tilt with respect to a horizontal plane than with prior art undercarriages. Moreover, the stability of a rock drill unit mounted on an undercarriage according to the present invention is particularly improved when traversing uneven or rough terrain.

The crawler undercarriage of the present invention also provides for more even distribution of the weight of the entire unit acting on the crawler assemblies. The provision of a centrally positioned transverse axle and a pair of transverse equalizer beams interconnecting the crawler assemblies at points substantially equidistant on either side of the axle assures greater stability and ground contact of the undercarriage. The double equalizer beam arrangement also reduces the "toeing-in" of the crawler assemblies when the crawler frames undergo pivotal movement and thereby excessive bending stress on the transverse axle is prevented.

BRIEF DESCRIPTION OF THE DRAWINGS

FIG. 1 is a longitudinal elevation of a mobile rock drill unit embodying the crawler undercarriage of the present invention.

FIG. 2 is a transverse elevation of the mobile rock drill unit according to FIG. 1.

FIG. 3 is a plan view of the crawler undercarriage of the present invention.

FIG. 4 is a view of one of the double equalizer beams showing the connections to the crawler frames and the main unit platform.

FIG. 5 is a fragmentary elevation of one of the equalizer beams.

DESCRIPTION OF THE PREFERRED EMBODIMENT

Figure 6:
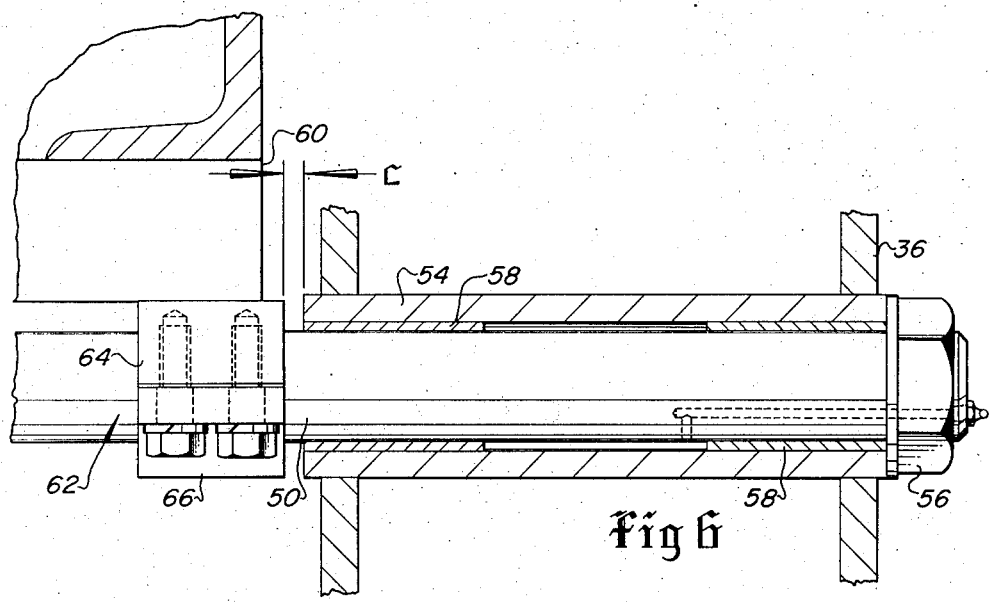
FIG. 6 is a detail illustrating the connection of the transverse axle to one of the crawler frames and is taken along the line 6—6 of FIG. 3.

Referring to FIGS. 1 and 2, the present invention is advantageously utilized in conjunction with a mobile rock drill unit generally designated by the numeral 10. The rock drill unit 10 is completely self-contained and self-propelled and is equipped with an elongated feed support 12 for supporting a rock drill 14. The support 12 is pivotally mounted on a boom 16 which is suitably adapted for positioning the support 12 in a great number of positions whereby the drill 14 may be operated to drill holes in the earth. The boom 16 is suitably connected to the deck 18 of the rock drill unit 10 by the pivotal connection 20. A fluid operated cylinder 22 is operable to pivot the boom 16 about the connection 20 in the vertical plane. A second fluid operated cylinder 24 is operable to pivot the feed support 12 with respect to the boom 16 at the pivot 26.

The deck 18 of the rock drill unit includes suitable prime mover means such as an engine mounted within the enclosure 28. The engine (not shown) may be adapted to drive a pressure fluid pump for supplying pressure fluid in a known way for use in operating the rock drill 14 as well as the aforementioned positioning cylinders and unit propelling means to be described briefly herein. The operation of the rock drill unit 10 may be controlled from an operator's cab 30 mounted on the deck 18.

The rock drill unit 10 advantageously includes a crawler undercarriage, generally designated by the numeral 32. Referring to FIGS. 1, 2 and 3, the undercarriage 32 is characterized by a pair of spaced parallel crawler assemblies 34 each including a crawler frame 36 supporting rotatable sprockets 38 and 40 and rollers 42 for supporting and driving flexible endless tracks 44 in a manner well known. The crawler assemblies 34 each also include a fluid operated motor 46, FIG. 2, operatively connected to the sprocket 40 for driving the endless tracks 44.

The deck 18 is mounted on the crawler undercarriage 32 by means of a suitable turntable 48 whereby the deck and the rock drill support 12 connected to the deck may be pivoted with respect to the undercarriage.

Referring to the plan view of FIG. 3 the undercarriage 32 is shown minus the endless tracks and associated driving gear and the crawler frames 36 are represented in a somewhat simplified way as hollow boxlike structures. The crawler frames 36 are interconnected by a pivotally mounted transverse axle 50 located substantially midway between bearing supports 52 for the aforementioned sprockets 38 and 40 which are at opposite ends of the crawler frames. As shown in FIG. 3 and FIG. 6 opposite ends of the axle 50 are rotatably journaled in bearing supports 54 on the crawler frames 36 and the axle is retained in connection with said frames by means of nuts 56 threaded over the respective ends of the axle. Suitable bearing inserts 58 are housed within the bearing supports 54. The undercarriage 32 includes frame means comprising a platform 60 formed of conventional structural metal shapes welded together. The platform 60 is partially supported by the transverse axle 50 and is attached thereto by means of the clamp assemblies 62 having portions 64 attached to the platform 60 and separable cap portions 66 for clamping the platform to the axle. The platform is clamped nonrotatably with respect to the axle 50. As shown in FIG. 6 some axial movement of the crawler frame 36 with respect to the pivot axis of the axle 50 is allowed for by the clearance C between the bearing support 54 and the clamp 62.

The undercarriage 32 also includes a pair of equalizer beams 68 spaced substantially equidistant from and on either side of the axle 50. The equalizer beams 68 are each provided at their respective opposite ends with a pivotal connection to the spaced apart crawler frames at 70. Each equalizer beam is also pivotally connected to the platform 60 wherein the platform is supplied with U-shaped brackets 74 located essentially on the longitudinal centerline of the undercarriage 32. The equalizer beams 68 are illustrated as being fabricated tapered H-beam sections over most of their length except for the relatively thick platelike end portions 76. The respective end portions 76 extend through openings 78 in the sidewalls of the crawler frames whereby the beam is pivotally connected to spaced apart plates 80 which are formed as part of the crawler frame.

Figure 7:
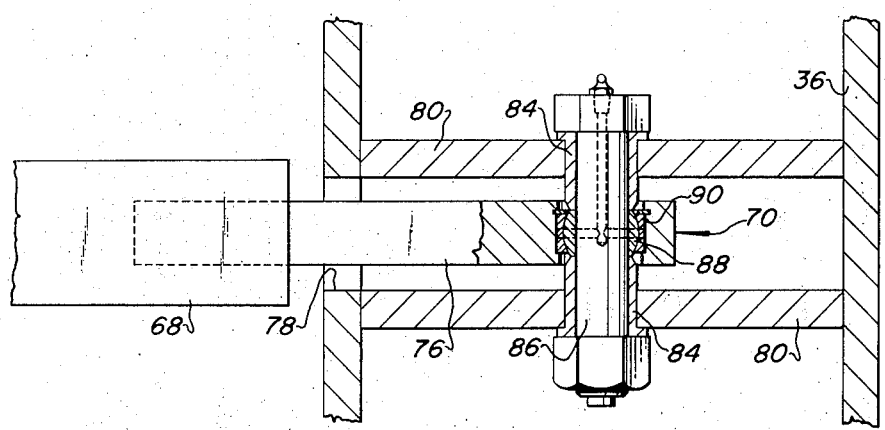
FIG. 7 is a detail illustrating the pivotal connection of one of the equalizer beams to a crawler frame.

A detailed view, typical of the pivotal connections of the equalizer beams 68 to the crawler frames, is illustrated in FIG. 7. The plates 80 include openings for supporting bushings 84 in which are journaled a pivot pin 86 formed as a bolt and nut assembly. Located between the bushings 84 and supported by the pin 86 is a spherical bearing element 88 which is journaled in a complementary spherical bushing 90. The bushing 90 is housed in the end portion 76 of the equalizer beam. The connection shown in FIG. 7 is typical of the end connections of each equalizer beam 68 to the crawler frames 36.

As shown in FIGS. 4 and 5 the equalizer beams 68 are similarly pivotally connected to the platform 60. The U-shaped brackets 74, integrally formed on the platform, support pinlike bolts 92 in bushings 94. Spherical bushings 96 are located in housing portions 98 located on the equalizer beams. The spherical pivot bearing connections between each end of the equalizer beams and the crawler frames and between the support platform and the middle of each equalizer beam provides for substantial freedom of movement between the interconnected parts while maintaining suitable load transmitting connections.

With the transverse axle 50 located substantially midway between opposite ends of the crawler frames 36, the rock drill unit 10 is subject to less tilting as the undercarriage encounters broken or uneven terrain when moving in either direction than would be experienced with an undercarriage having the axle located near one end of the crawler assemblies. This is particularly advantageous when the undercarriage 32 is used with the rock drill unit 10 which, having the turntable 48, is operable to position the rock drill in a 360° sweep in the horizontal plane. With prior art crawler assemblies in order to minimize tilting of the platform when positioning a rock drill unit it is usually necessary to approach uneven terrain with the end of the crawlers opposite the axle end. In other words prior art rock drill undercarriages have a preferred or "front" end. With the rock drill unit 10 a substantial advantage of the 360° sweep of the unit provided by the turntable would be negated if it were necessary to always approach the eneven terrain with the same end of the undercarriage.

Although the present invention is illustrated in use with a rock drill unit having a turntable type of mounting the crawler undercarriage 32, with minor modification of the platform 60, could also be used advantageously with the type of rock drill unit wherein an elongated mast or derrick is pivotally mounted on the undercarriage and is supported by fluid cylinder type positioners. The advantages of the use of the crawler undercarriage of the present invention with such a unit include minimizing the adjustments necessary to position the mast for drilling vertical holes in the earth and consequently shorter and more rigid positioning cylinder assemblies can be used.

The undercarriage 32 is also more stable than prior art undercarriages due to the even distribution of weight provided for by the double equalizer beam arrangement wherein the weight borne by the crawler assemblies tends to be more evenly distributed along the length of the crawler assemblies. Also, as previously mentioned, the tendency for the ends of the crawler assemblies to move toward or away from each other when pivoting about the axle, is reduced more effectively with a double equalizer beam arrangement in accordance with the present invention without creating substantial bending stress on the transverse axle. The limited freedom of the crawler frames to move axially on the axle 50 when undergoing pivotal or oscillatory motion reduces the bearing loads on the spherical pivot bearings and reduces stress on the crawler frames as the crawler assemblies 34 are free to move somewhat closer together while remaining parallel.

What is claimed is:
1. In a crawler undercarriage:
   a single pair of spaced apart parallel crawler frames adapted to movably support flexible endless tracks thereon;

a transverse axle located substantially midway between opposite ends of said crawler frames and having opposite end portions pivotally connected to said crawler frames;

a pair of equalizer beams spaced equidistant on opposite sides of said transverse axle and having their respective opposite end portions pivotally connected to said crawler frames by spherical bearing means; and frame means located between said spaced apart crawler frames and supported by said equalizer beams and said transverse axle.

2. The invention set forth in claim 1 wherein: said equalizer beams include spherical bearing means for pivotally connecting said equalizer beams to said frame means.

3. The invention set forth in claim 1 wherein: said crawler frames include journal bearing means for supporting said opposite end portions of said transverse axle and said crawler frames are movable axially on said opposite end portions of said transverse axle in response to pivotal movement of said crawler frames with respect to said transverse axle.

* * * * *